United States Patent [19]

Collier

[11] 4,437,280
[45] Mar. 20, 1984

[54] CABINET PANEL CONNECTOR

[76] Inventor: David L. Collier, 255 NW. 96th Ave., Portland, Oreg. 97229

[21] Appl. No.: 296,891

[22] Filed: Aug. 27, 1981

[51] Int. Cl.³ .............................................. E04B 7/00
[52] U.S. Cl. ................................................. 52/285
[58] Field of Search ................ 52/285, 585, 284, 282, 52/286; 312/263; 403/12, 406, 231, 294, 407

[56] References Cited

U.S. PATENT DOCUMENTS

| | | | |
|---|---|---|---|
| 918,953 | 4/1909 | Bowman | 52/282 |
| 1,136,811 | 4/1915 | Kasanszky et al. | 403/8 |
| 3,070,646 | 12/1962 | Lindgren | 52/282 |
| 3,159,440 | 12/1964 | Courtwright | 52/285 X |
| 3,559,357 | 2/1971 | Lowe | 52/282 |
| 3,877,764 | 4/1975 | Hillier, Jr. | 312/263 X |
| 4,060,949 | 12/1977 | Busse | 52/285 |
| 4,208,850 | 6/1980 | Collier | 52/585 X |

FOREIGN PATENT DOCUMENTS 403301  8/1967  Australia .......................... 312/263

Primary Examiner—John E. Murtagh
Assistant Examiner—Kathryn L. Ford
Attorney, Agent, or Firm—Oliver D. Olson

[57] ABSTRACT

One of a pair of panels to be joined together is provided with a longitudinally extending panel support groove cut parallel to an edge of the panel, and a connector mounting slot is cut from the edge of the panel inward, perpendicularly crossing said groove, terminating a spaced distance inwardly of the groove. The second of the pair of panels incorporates a bore arranged to be a spaced distance above, and aligned with said mounting slot when the panels are in position to be joined together. A panel has a connector body mounted on a base slidably engaging said mounting slot, and a locking pin on the connector body is arranged to intercept the bore in the other panel, thereby releasably securing the second panel to the first panel by means of the connector.

11 Claims, 12 Drawing Figures

CABINET PANEL CONNECTOR

BACKGROUND OF THE INVENTION

This invention relates to prefabricated, knockdown cabinets, and more particularly to a novel panel connector by which pairs of cabinet panels are joined together by connectors which do not require the use of any tools.

Connectors to facilitate the securing of a pair of prefabricated cabinet panels together have been provided heretofore. However they have been characterized by one or more of their parts being secured, as by screws, to a panel, either prior to packaging or during assembly of the cabinets.

This invention is an improvement on my earlier U.S. Pat. No. 4,208,850.

SUMMARY OF THE INVENTION

In its basic concept, this invention provides a knockdown cabinet in which pairs of panels are secured together by connectors each of which is provided with a mounting flange receivable slidably in a groove which secures the connector to one of the panels of the pair and orients it relative to the other panel of the pair.

It is by virtue of the foregoing basic concept that the principal objective of this invention is achieved; namely, the provision of a knockdown cabinet which may be easily and speedily assembled without use of tools by unskilled personnel.

Another object of this invention is the provision of a knockdown cabinet of the class described in which the panel connectors may also serve as support pegs for cabinet shelves.

A further object of this invention is the provision of a knockdown cabinet of the class described in which the connectors may be configured to secure a panel either by cooperation with a panel-mounting groove or independently of such groove.

A still further object of this invention is the provision of a knockdown cabinet of the class described which is of simplified construction for economical manufacture.

The foregoing and other objects and advantages of this invention will appear from the following detailed description, taken in connection with the accompanying drawings of preferred embodiments.

DESCRIPTION OF THE PREFERRED EMBODIMENTS

Figure 2:
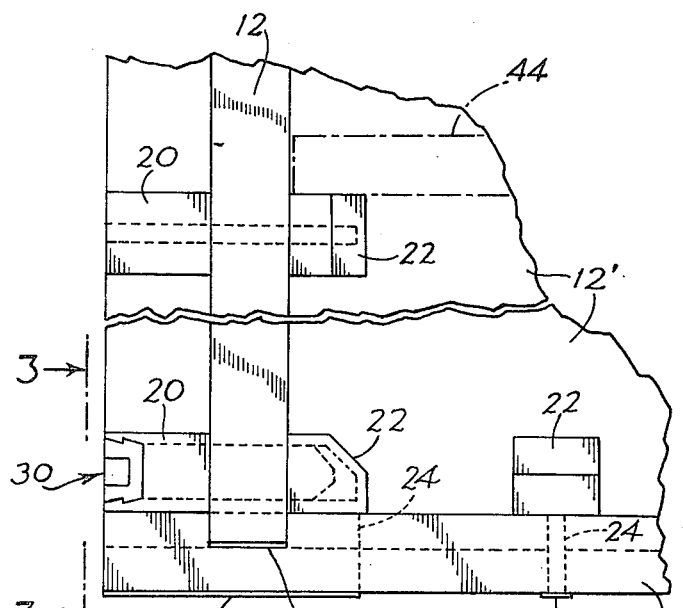
FIG. 2 is a foreshortened fragmentary view of a portion of a cabinet secured together by the connector of FIG. 1.

With the exception of FIG. 2, which illustrates a corner portion of a cabinet with three panels having been joined together and placement of a shelf on one component of a connector, it is to be noted that the drawings illustrate a single pair of cabinet panels to be joined together. This single pair of cabinet panels is sufficient to illustrate the invention, it being understood that a knockdown cabinet may be composed of a large number of pairs of panels connected together releasably by means of one or more of the various forms of panel connectors described herein.

Figure 1:
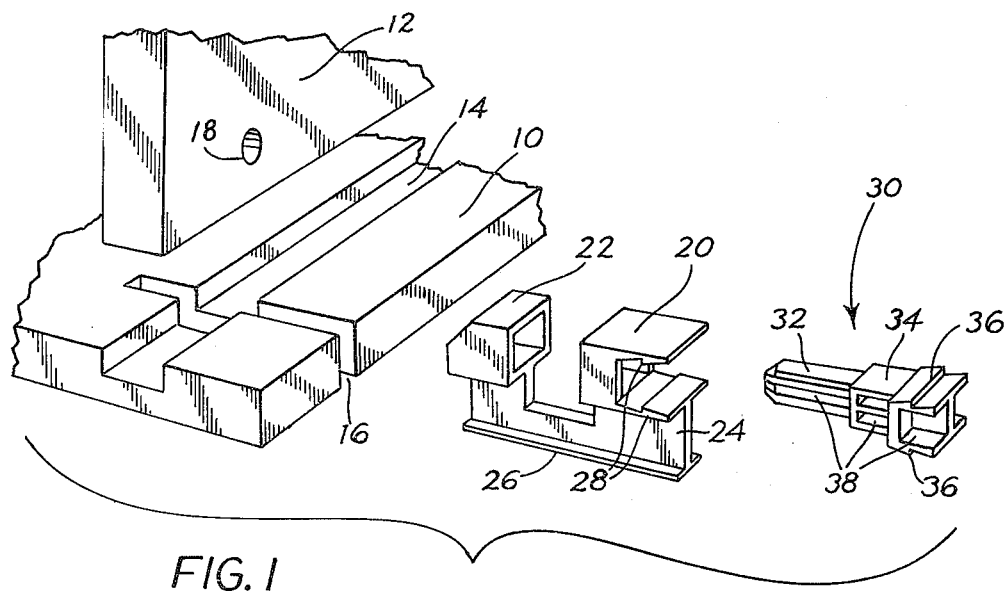
FIG. 1 is a fragmentary perspective view of a portion of a knockdown cabinet and connector embodying the features of this invention, the pair of cabinet panels and connector components being shown in separated condition.
Figure 3:
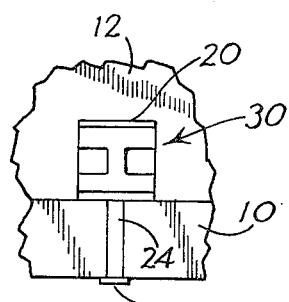
FIG. 3 is a fragmentary end view of one of the connectors of FIG. 2 as viewed along the line 3—3 in FIG. 2.

Referring first to the embodiment illustrated in FIGS. 1, 2 and 3, there is shown portions of a horizontal panel 10 a vertical end panel 12 and vertical back panel 12' to be joined together. There is illustrated a longitudinal groove 14 cut in the panel 10 a spaced distance from and parallel to the panel edge, the groove configured to receive one edge of the vertical panel 12. A connector mounting slot 16 is arranged to extend inwardly from the outside edge of panel 10 across the groove 14 where it terminates a predetermined spaced distance inwardly thereof. FIG. 1 also illustrates a bore 18 arranged a spaced distance above the bottom edge of panel 12, the bore arranged to be in alignment with said mounting slot 16 when the pair of panels are in position to be joined together.

FIG. 1 also illustrates one embodiment of the connector of this invention, the connector preferably being molded of synthetic resin material. This connector is illustrated as comprising two body member components 20 and 22 each mounted to a base member. In this embodiment, the base member is illustrated as a web 24 configured for slidable reception in the slot 16. The web projects downwardly from the body members a distance substantially equal to the thickness of the panel 10 to which the connector is to be mounted. An outwardly projecting flange 26 is arranged along the bottom edge of the web 24 for abutting contact with the surface of the panel 10 opposite the surface thereof which is in abutting contact with the body members 20 and 22.

The body components 20 and 22 are arranged on the web 24 so that they are separated from each other by a distance substantially equal to the width of the panel-supporting groove 14. It is to be noted that the portion of the web intermediate the body members 20 and 22 is of reduced height in order not to interrupt the plane of the bottom of the groove 14 when the connector is fully inserted into its connecting position relative to the slot 16.

Connector body member 20 is illustrated as being substantially rectangular in cross section, hollow, and open at its front and rear ends. The body side walls are configured with their front portions arranged to form inwardly facing notches 28 adjacent the top and bottom walls.

The connector body member 22 is configured substantially as a hollow box which is open at its front end facing the space separating the body members and therefore the panel 12 to be interposed therebetween.

A locking pin 30 is configured to be inserted into the connector bodies as shown in FIGS. 1 and 2. The pin is formed as an elongated piece, one end preferably configured as a cylindrical peg 32, the opposite end 34 arranged to communicate with the inner, hollow connector body member 20. Notches 36 are arranged to cooperate with the notches 28 in the body component 20 in order to lock the pin securely in engagement with the connector body. It is illustrated that the locking pin is formed with voids 38 to reduce the amount of material used in manufacture and therefore correspondingly reduce material cost and weight.

Figure 5:
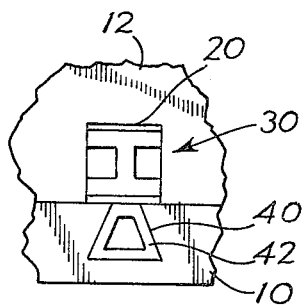
FIG. 5 is a fragmentary end view of the connector of FIG. 4 as viewed along the line 5—5 in FIG. 4.
Figure 4:
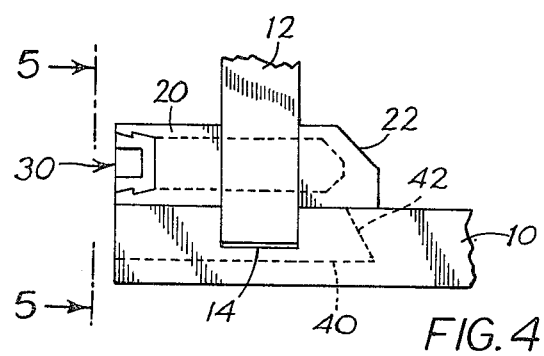
FIG. 4 is a fragmentary view of another embodiment of the connector of this invention, the connector incorporating a dovetail flange arranged to be received in a dovetail slot in the one panel.

FIGS. 4 and 5 illustrate the construction of the cabinet and connector body components previously described. However, the means for mounting the connector to the panel 10, previously shown as a mounting slot 16 and a base member in the form of a web 24, is replaced by a conventional dovetail slot 40 incorporated into the panel 10 and a base member in the form of a dovetail tenon 42. This construction eliminates the need of the projecting flange 26 on the exterior surface of the cabinet and hence any consequent disadvantages with regard to appearance.

In setting up the cabinet of FIGS. 1-5, the connector body and web assembly is inserted fully into the corresponding mounting slot 16 or 40 incorporated on the panel 10. The depth of the slot 16 or 40 is predetermined to form an abutment for the inner end of the web 24 or 40 for aligning the open space between components 20 and 22 with the groove 14. The panel 12 is aligned in the panel supporting groove 14 so that the bore 18 aligns with the openings of the connector body components 20 and 22. The locking pin 30 then is inserted into the open end of component 20 and pressed inward so that it extends through the bore 18 and into the hollow component 22. The locking notches 36 on the pin engage the notches 28 on the body member to securely lock the pin in place and prevent its inadvertant withdrawal. The process is repeated with other connectors and panels, as required for the construction of the cabinet.

Body component 22 is configured with a flat side surface to perform the additional function of providing a support for removable placement of a cabinet shelf 44, spaced above the panel 10, as shown in broken lines in FIG. 2. In this illustration the connector 20, 22 interconnects the panel 12 and the back panel 12'. Additional connectors which interconnect other vertical panels will serve additionally as supports for shelf 44.

Figure 7:
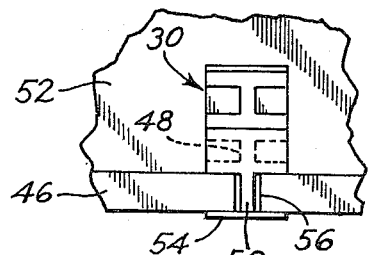
FIG. 7 is a fragmentary end view of the connector of FIG. 6 as viewed along the line 7—7 in FIG. 6.
Figure 6:
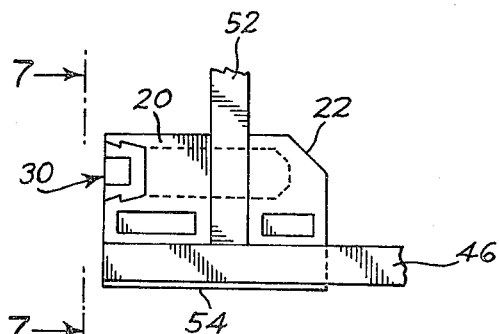
FIG. 6 is a fragmentary view of still another embodiment of a knockdown cabinet of this invention in which a thinner panel is used and the connector is configured to provide support for the panel in the absence of a panel-supporting groove.

The embodiment illustrated in FIGS. 6 and 7 provides for a knockdown cabinet construction in which a thinner panel 46 may be used, by avoiding the requirement of the previously illustrated support groove 14 in panel 10. The connector, while embodying features of the previously described connectors, includes a spacer 48 disposed between the body components 20 and 22 and the web 50 in order to space the opening 18 in panel 52 a sufficient distance from its lower edge to provide adequate strength. However, because the body components 20 and 22 are spaced further from the panel 46, and because there is no support groove to secure the second panel 52, wider project flange 54 is used for increased support against twisting or torquing of the connector. The slot 56 in panel 46 preferably is somewhat wider than the web 50 to accommodate a limited degree of lateral movement of the connector for adjusting the alignment of the panels 46 and 52. The web 50 is of reduced height to correspond with the reduced thickness of the panel, to provide a press fit for body component 20. The space between the body components 20 and 22 and the length of the locking pin 30 are reduced to correspond with the reduced thickness of the second panel 52.

Figure 8:
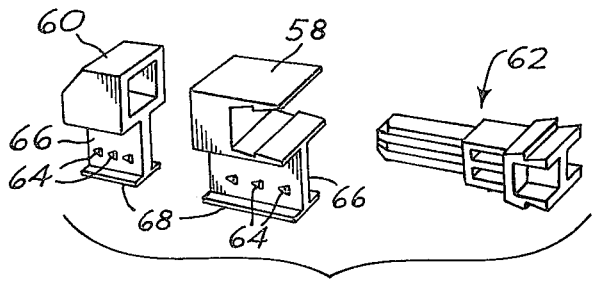
FIG. 8 is an exploded perspective view of still another embodiment of the connector of this invention, the connector body and base comprising two component parts incorporating locking teeth on their base flanges to prevent inadvertent slippage of the components in the panel slots.

The connector embodied in FIG. 8 closely resembles that illustrated in FIG. 1. However, it is to be noted that the body members 58 and 60 of FIG. 8 are not connected together by a common mounting means, as by the web 24 of FIG. 1. This embodiment accommodates variations in thickness of the vertical panel 12 and groove 14.

Because the body components 58 and 60 are not secured together and therefore body component 58 is not locked into the mounting slot 16 or 40 by vertical panel 12, there is a possibility for the body component 58 to creep outward and away from the vertical panel. Accordingly, projecting locking teeth 64 are arranged on the sides of the web 66 as shown, or on the bottom surfaces of at least the component 58 or the upper surfaces of the flange 68 thereof. The locking teeth are arranged to engage the panel 10 and prevent retraction of the body component.

Figure 9:
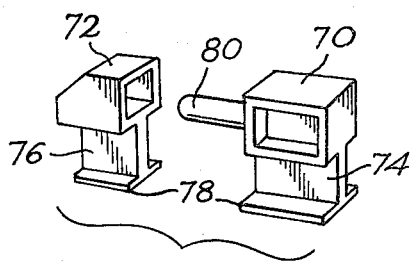
FIG. 9 is an exploded perspective view of still another embodiment of the connector of this invention in which the locking pin is affixed to one component part of the connector body and base.

FIG. 9 illustrates a connector similar to that of FIG. 8 in that there are two separate body components 70 and 72 supported on mounting webs 74 and 76, respectively, which incorporate the web flanges 78. However, in this embodiment the body component 70 incorporates a locking pin 80 as an integral part of its construction. Also, the thickness of flange 76 is substantially the same as groove 16, while the thickness of flange 74 is less than that of the groove 16. This allows body component 70 a degree of lateral movement for the purpose described hereinbefore.

Figure 10:
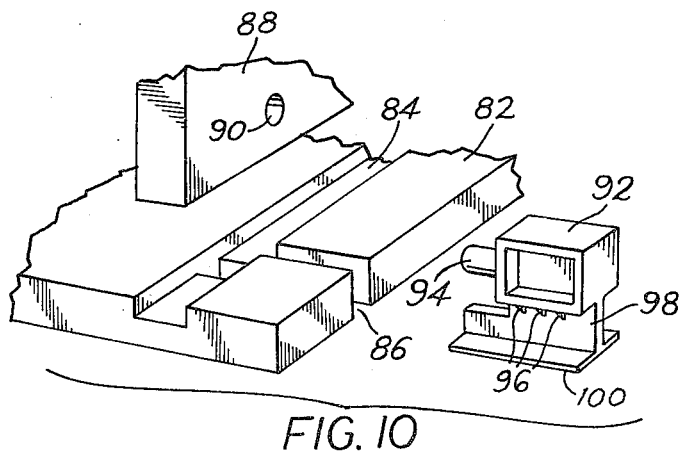
FIG. 10 is a fragmentary exploded perspective view of a portion of a cabinet of the class described and still another embodiment of the connector arranged to be disposed on one side of a panel.
Figure 12:
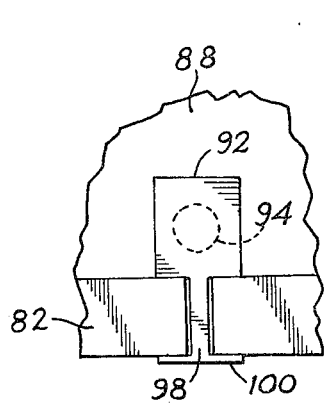
FIG. 12 is a fragmentary end view of the connector of FIG. 11 as viewed along the line 12—12 in FIG. 11.
Figure 11:
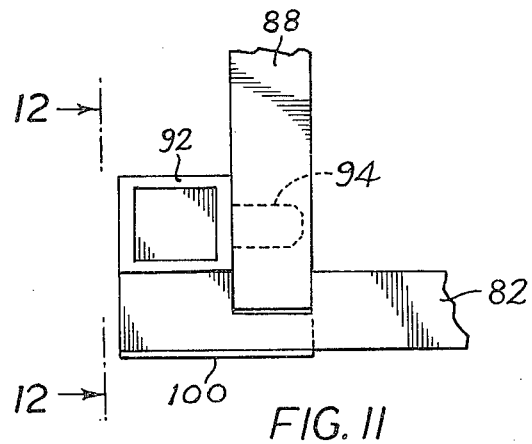
FIG. 11 is a fragmentary side elevation of a portion of a cabinet secured together by the connector of FIG. 10.

FIG. 10 illustrates a portion of a cabinet wherein a horizontal panel 82 incorporates a panel-support groove 84 and a mounting slot 86. A vertical panel 88 incorporates a bore 90 arranged to be in alignment with the slot 86 when the panels are in position to be joined together. There is also shown a connector comprising a single body component 92 of the same construction as body component 70 of FIG. 9 with the exception that the integral locking pin 94 is shorter than integral locking pin 80. Locking teeth 96 are incorporated on the underside of the connector in panel engaging relationship to prevent outward retraction of the connector.

In connecting the panels 82 and 88 together, the panel 88 is arranged in the panel support groove 84 of panel 82 so that the bore 90 aligns with the mounting slot 86. The connector is pressed fully into the slot so that the locking 92 intercepts but does not extend through the opening 90, thereby firmly securing the second panel to the first. The web 98 is narrower than the slot 86, whereby to accommodate limited adjustment of the panels relative to each other, as in the embodiment of FIG. 9. However, it is longer than the web of FIG. 9, to provide added stability for the body component 92. The projecting teeth 96 serve to maintain the connector in locked engagement with the panels, the flange 100 being spaced from the teeth a distance slightly less than the thickness of the panel 82.

This manner of cabinet construction, while affording the advantages of eliminating the need for tools and cabinetry experience, also affords distinct advantages in packaging, shipping, and labor of manufacture. Since there is nothing to be attached to the pre-cut panels prior to assembly into cabinet form, the panels may be conveniently stacked and stored and shipped without wasted space created by connector parts projecting from the panels. And since there is nothing pre-assembled prior to shipping, labor at the factory is limited to only the construction and separate packaging of the panels and connectors.

It will further be apparent to those skilled in the art that various changes other than those previously discussed may be made in the size, shape, type, number, and arrangement of parts described hereinbefore. For example, the illustrated dove-tail tenon and slot arrangement and the straight-line slot and web arrangement may be interchanged, as desired. The integral body component 92 and pin 94 may be replaced with separate components such as the body component 58 and separate pin 62 in FIG. 8. These and other changes may be made without departing from the spirit of this invention and the scope of the appended claims.

Having thus described my invention and the manner in which it may be used, I claim:

1. In combination with a pair of panels to be connected together, one panel provided with a mounting slot extending inwardly from one side edge thereof and the second panel provided with a locking bore, a panel connector comprising:
   (a) a body member,
   (b) a base member connected integrally to and projecting from said body member, the base member configured to slidably enter said mounting slot from said one side edge, with the body member projecting from the surface of said one panel facing said second panel, the base member also configured to engage said one panel to secure the base member and body member against movement in the direction of the surface of said one panel facing said second panel,
   (c) a locking pin associated with said body member arranged to intercept said bore in the second panel and thereby lockably interconnect said second panel and the body member secured to said one panel, and
   (d) second panel support means on the one panel arranged to engage the side of the second panel opposite said body member to prevent movement of the second panel away from the body member and disengagement from the locking pin.

2. The combination of claim 1 wherein the body member is a single member mounting the locking pin, the one panel has a groove therein receiving the said second panel, and the inner end of the mounting slot is arranged for abutment by the base member when the side of the body member from which the locking pin extends is located for abutment by the second panel.

3. The combination of claim 1 wherein the inner end of the mounting slot is arranged for abutment by the base member when the side of the body member from which the locking pin extends is located for abutment by the second panel.

4. The combination of claim 1 including spacer means between the body member and the base member for spacing the locking pin a predetermined distance from the said one panel.

5. In combination with a pair of panels to be connected together, one panel provided with mounting slot means and the second panel provided with a locking bore, a panel connector comprising:
   (a) a body member,
   (b) a base member connected to said body member engaged in said mounting slot means to secure the body member to said one panel, the body member comprising two components releasably mounted to said one panel, the components arranged to be disposed on opposite sides of the second panel in alignment with said bore, and
   (c) a locking pin associated with said body member arranged to intercept said bore in the second panel and thereby lockably interconnect said second panel and the body member secured to said one panel, said locking pin being in engagement with one component of the connector and extending through the bore and into the other component of the connector.

6. The combination of claim 5 wherein said locking pin is configured to releasably engage said one component of the connector.

7. The combination of claim 6 wherein said connector body components are mounted to a common base member and spaced apart from each other by a distance substantially equal to the width of the second panel interposed therebetween.

8. The combination of claim 7 wherein the inner end of the mounting slot is arranged for abutment by the base member when the space between the two body member components is disposed in the position of the second panel.

9. In combination with a pair of panels to be connected together, one panel provided with a dovetail mounting slot and the second panel provided with a locking bore, a panel connector comprising:
   (a) a body member,
   (b) a base member configured as a dovetail tenon received within said dovetail slot on the one panel to secure the body member to said one panel, and
   (c) a locking pin associated with said body member arranged to intercept said bore in the second panel and thereby lockably interconnect said second panel and the body member secured to said one panel.

10. In combination with a pair of panels to be connected together, one panel provided with a straight slot extending through said one panel inwardly from one side edge thereof, and the second panel provided with a locking bore, a panel connector comprising:
   (a) a body member,
   (b) a base member configured as a web extending from the body member slidably through said slot in the one panel, with the body member projecting from the surface of said one panel facing said second panel,
   (c) an outwardly projecting flange on the web opposite the body member abutting the opposite side surface of the panel to secure the base member and body member against movement in the direction of the surface of said one panel facing said second panel, and (d) a locking pin associated with said body member arranged to intercept said bore on the second panel and thereby lockably interconnect said second panel and the body member secured to said one panel.

11. In combination with a pair of panels to be connected together, one panel provided with mounting slot means and the second panel provided with a locking bore, a panel connector comprising:

(a) a body member, (b) a base member connected to said body member engaged in said mounting slot means to secure the body member to said one panel, (c) locking teeth on the connector arranged to engage the said one panel to allow its attachment to said panel but to inhibit its disengagement from the panel, and (d) a locking pin associated with said body member arranged to intercept said bore in the second panel and thereby lockably interconnect said second panel and the body member secured to said one panel.

* * * * *